April 17, 1928.　　　　J. X. PHILLIPS, JR　　　　1,666,108
WINDSHIELD CLEANER
Filed Jan. 7, 1924　　　2 Sheets-Sheet 1
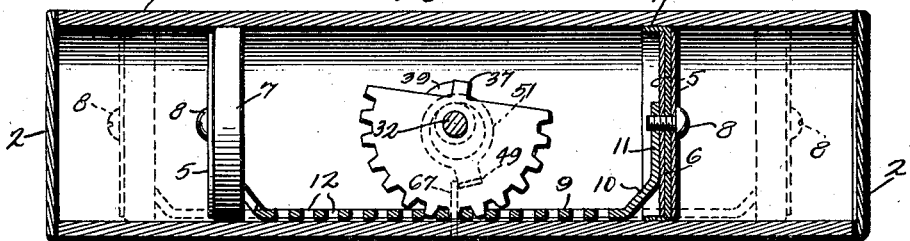
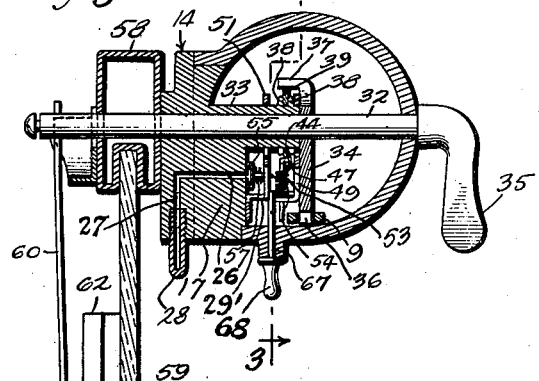
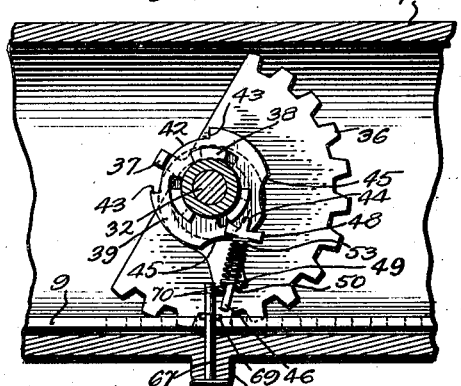
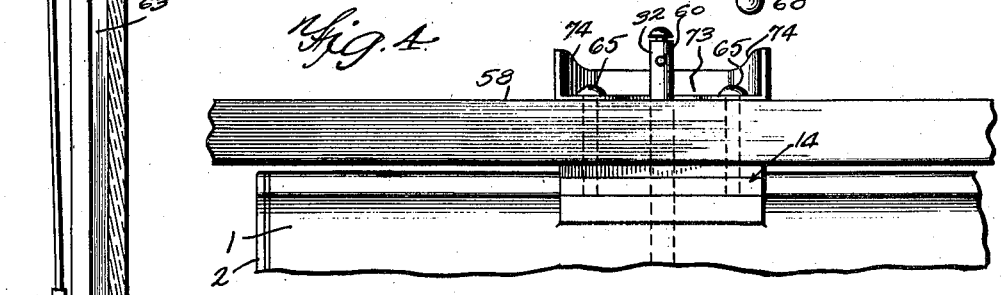
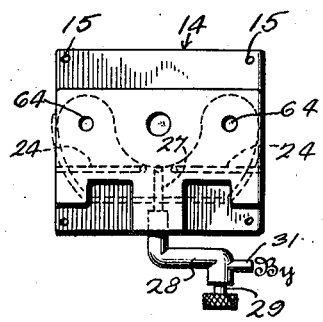
Inventor
John X. Phillips Jr.,
By
Attorney

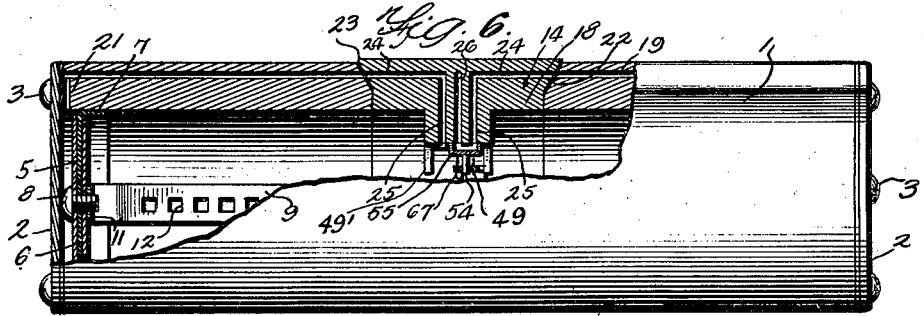
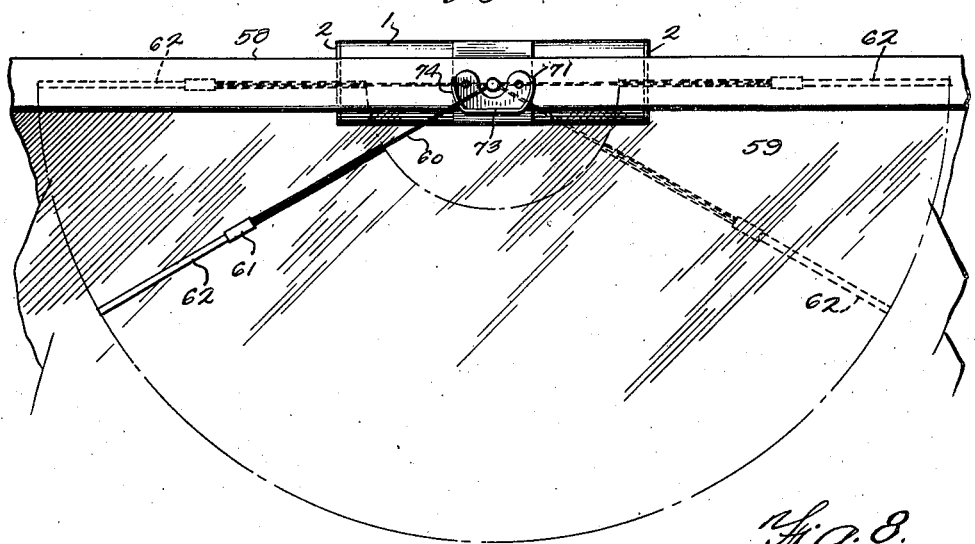
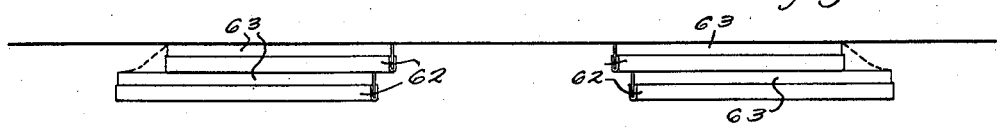
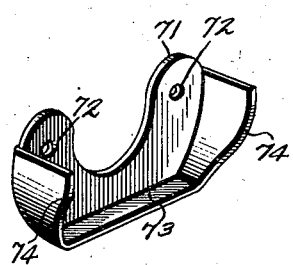

Patented Apr. 17, 1928.

1,666,108

UNITED STATES PATENT OFFICE.

JOHN X. PHILLIPS, JR., OF WASHINGTON, DISTRICT OF COLUMBIA, ASSIGNOR, BY MESNE ASSIGNMENTS, TO TRICO PRODUCTS CORPORATION, OF BUFFALO, NEW YORK, A CORPORATION OF NEW YORK.

WINDSHIELD CLEANER.

Application filed January 7, 1924. Serial No. 684,823.

This invention relates to windshield cleaners, and more particularly to power operated cleaners adapted to be actuated by suction or pressure.

In the patent to F. G. Folberth and W. M. Folberth, granted November 27, 1923, No. 1,475,625, there is described and claimed a windshield cleaner having a cleaner member normally maintained against the windshield to be cleaned by the tension of the cleaner arm which carries the cleaner element, and means are provided for releasing the tension of the cleaner arm and moving the cleaner element away from the window when the cleaner is not in use.

In a copending application Serial No. 648,818, filed June 30, 1923, I have disclosed and claimed a windshield cleaner in which the cleaner arm is maintained in contact with the glass or windshield during the normal operating stroke and in which means are provided to permit the cleaner arm to move beyond its normal path and at the same time move it away from the window.

An object of the present invention is the provision of improved means for moving the cleaner element to an inoperative position out of contact with the windshield when it is not in use.

More specifically, the invention relates to means for moving the cleaner arm upwardly out of the driver's vision and outwardly away from the glass and is particularly adapted for use in connection with a windshield cleaner construction described and claimed in the copending application of F. G. Folberth and W. M. Folberth, Serial No. 671,937, filed October 31, 1923.

In the accompanying drawings, I have shown one embodiment of the invention. In this showing:

Figure 1 is a central longitudinal sectional view through the motor cylinder,

Figure 2 is a vertical transverse sectional view centrally through Fig. 1 showing the cleaner in position, Figure 3 is a detail sectional view on line 3—3 of Figure 2, Figure 4 is a plan view of the windshield and a portion of the cleaner, Figure 5 is a detail view of a closure plate forming a part of the cleaner motor, Figure 6 is a plan view of the cleaner motor, parts being shown in section, Figure 7 is a front elevation of a portion of the windshield showing the normal movement of the cleaner and showing the movement of the cleaner when moved to an inoperative position, Figure 8 is a plan view showing the path of movement of the cleaner element, and, Figure 9 is a perspective view of a cam by means of which the cleaner element is moved outwardly away from the window.

Referring to the drawings, the reference numeral 1 designates the casing of the motor which, as shown, may be cylindrical and which is provided with cylinder heads 2, arranged at opposite ends and retained in position by means of suitable fastening elements 3, received in openings in the ends of the cylinder. A pair of pistons are arranged within the cylinder and suitably spaced from each other. Each of the pistons consists of disks 5, formed of any suitable material, and a strip of suitable packing material 6 is arranged between the disks. The packing material is of larger diameter than the interior diameter of the cylinder, forming a flange 7. The parts of the piston are secured to each other by means of a centrally arranged screw 8. A connecting member 9 is arranged between the pistons and this connecting member is provided with inclined portions 10, adjacent each end. The ends of the connecting member are arranged at right angles to the body portion, as indicated at 11, and are provided with suitable openings for the reception of fastening elements 8, whereby pistons are connected to each other and maintained in spaced relation. The body portion of the connecting member is provided with spaced openings 12, forming a rack for the transmission of power from the pistons.

The cylinder is provided with a relatively large opening arranged intermediate its ends. A closure plate 14 is adapted to be arranged over this opening. The closure plate is provided with openings 15, arranged adjacent each corner for the reception of suitable fastening elements which are received in openings in the flat faces of the cylinder opening. The closure plate is provided with an enlargement 17 on its inner face and is further provided with horizontally disposed ribs 18, extending from each side of the enlargement. Conduits 19 are arranged on the exterior of the cylinder, the conduits communicating with transverse ports 21 in the ends of the cylinder. The inner ends of the conduits are beveled, as at 22, and the adjacent side faces of the closure plate and the ribs are beveled, as at 23, to fit the beveled ends of the conduits. The ribbed portions of the closure plate are provided with passages 24, adapted to register with the ends of the passages 19 and these passages in turn communicate with transverse passages 25, extending inwardly through the enlargement 17 to its inner face. Between the passages 25, there is provided a passage 26, which communicates with a vertical passage 27, extending to the bottom of the closure plate. The lower end of this passage is enlarged and threaded to receive a coupling 28 which is provided with a valve 29. The coupling is provided with an inlet passage 31 and a flexible tube (not shown) is adapted to be arranged over the inlet opening to communicate with a suitable source of suction or pressure such as the intake manifold of an internal combustion engine (not shown).

A cleaner shaft 32 is arranged in an opening in the closure plate and enlargement 17. As shown, the enlargement is provided with a sleeve 33, extending into the cylinder and the shaft extends through this sleeve. A plate 34 is secured to the shaft 32. This plate is arcuate shaped and is provided with teeth 36, adapted to mesh with the openings 12 in the connecting member 9. Beyond the shaft, the plate is provided with an angular portion 37, arranged over the sleeve 33. A handle 35 is arranged on the inner end of the shaft exteriorly of the casing to permit manual operation of the shaft. The sleeve is provided with a plurality of spaced lugs 38, arranged in pairs, as shown in Figure 2 of the drawings, forming a groove between them. A disk 39 is mounted over the sleeve, the disk being provided with a central opening, substantially the same size as the diameter of the sleeve and being provided with recesses to permit the disk to pass over the outer set of lugs 38 and be arranged in the groove between the lugs. The upper edge of the disk is provided with a reduced portion 42, forming shoulders 43, adapted to be engaged by the angular member 37. The bottom of the disk is provided with an opening 44, and the edge of the disk on each side of the opening is provided with cut-out portions 45. A substantially T-shaped arm 46 is operatively connected to the disk. As shown, the upper end of the arm is provided with a pin 47, adapted to be received in the opening 44 in the disk.

The transverse arms 48 of the arm are arranged on one side of the disk in the same vertical plane with the inner set of lugs 38. The valve supporting member comprises a substantially U-shaped arm 49 operating between two stops 49' and having an opening 50 in its base portion for the reception of the lower end of the arm 46. The upper ends of this member are provided with circular portions 51, having openings adapted to loosely fit the sleeve 33. A spring 53 is arranged over the arm 46 between the transverse portions 48 and the base of the valve supporting member 49. A valve stem 54 is mounted in a suitable opening in one of the arms of the valve supporting member and this valve stem carries a cup-shaped valve 55, adapted to fit over the end of the passage 26 and the end of either of the passages 25, as shown in Figure 6 of the drawings. A spring 57 is arranged around the valve stem to retain the valve in engagement with the face of the enlargement 17.

The shaft 32 projects a slight distance outside of the motor and is adapted to pass through a windshield frame 58. The windshield frame is of the usual construction and is adapted to receive and support a windshield 59 of glass or other transparent material. A cleaner arm 60 is secured to the shaft, the cleaner arm being preferably formed of resilient material to permit adjustment toward the face of the windshield. A retaining device 61 is arranged on the lower end of the cleaner arm and a cleaner member is mounted therein. The cleaner member consists of a backing strip 62 of metal or other rigid material and a flexible strip 63 of rubber or the like. On each side of the shaft, the closure plate is provided with threaded openings 64, adapted to receive bolts 65 (see Figure 4) which pass through the windshield frame to support the motor casing.

In Figure 7 of the drawings, the cleaner element is shown in full lines at its limit of normal movement on one side of the center and is shown in dotted lines in a similar position on the opposite side of the center. In order to move the cleaner element to a substantially horizontal position, as indicated in Figure 7 of the drawings, the pistons are moved outwardly beyond their normal path of reciprocation. In Figure 1 of the drawings, the pistons are shown in a substantially central position and their normal limit of reciprocation is indicated in dotted lines, slightly spaced from the cylinder heads. When the pistons are moving in either direction, the snap over mechanism functions to shift the position of the valve 55 and causes the pistons to move in a reverse direction. In order to continue the movement in a given direction and move the cleaner element to the substantially horizontal position shown in Figure 7 of the drawings, the cylinder is provided with a boss or enlargement 66 arranged equidistant from the ends and this boss or enlargement is provided with an opening. A pin 67 extends through this opening and the pin is provided with a handle 68 exteriorly of the cylinder. A transverse pin 69 may be arranged within the cylinder to prevent the pin 67 from becoming displaced. The pin 67 is adapted to be projected inwardly, as shown in Figure 3 of the drawings, into the path of the U-shaped arm 49 to prevent movement of this arm from one side of the center to the other and thus prevent the automatic valve from being actuated. The pin may be provided with a groove 70 in which the base of the U-shaped arm engages. Additional means are provided for moving the cleaner element outwardly away from the wnidow as it moves upwardly to a horizontal position as indicated in Figure 8 of the drawings. A plate 71 (see Figure 9) is arranged on the exterior of the windshield frame and this plate is provided with openings 72 for the reception of the bolts 65. The lower edge of the plate is provided with a flange 73 and cams 74 are formed on the opposite ends of the flange.

The normal operation of the device is the same as described in the copending application of F. G. Folberth and W. M. Folberth, Serial No. 671,937, heretofore referred to. The motor is connected to a source of suction and the valve 55 is adapted to be shifted to alternately connect the inlet passage to either of the passages 25 and thus create differential pressure in the ends of the cylinder. The movement of the pistons is transmitted to the cleaner shaft through the connecting member 9 and the segmental gear 34, normally moving the cleaner arm and cleaner element in an arc of a circle between the full line position shown to the left in Figure 7 of the drawings and the angular dotted line position shown to the right. With the parts in the position shown in Figure 1 of the drawings, the pistons are moving toward the right and the segmental gear 34 is revolving in a counter-clockwise direction. As this movement continues, the finger 37 engages the shoulder 43 tending to move the disk in a counter-clockwise direction. As the disk moves the upper end of the T-shaped member 46 is moved with it and the spring 53 is compressed. When the disk and the upper end of the T-shaped member 46 passes dead center, the spring snaps the disk and pin to the angular position at the right shown in Figure 3 of the drawings. If the pin 67 is in a withdrawn position, the U-shaped arm 49 is then swung to a similar position at the left against the left hand stop 49′, moving the valve 55 from the position shown in Figure 6 of the drawings to a similar position, establishing communication between the inlet passage 26 and the left end passage 25. This is the normal operation of the cleaner. When the operator intends to stop the cleaner, the pin 67 is moved inwardly to the position shown in Figures 1 and 3 of the drawings. This does not interfere with the operation of the disk 39 or the T-shaped member 46 but when the parts assume the position shown in Figure 3 of the drawings, at the end of a normal operating stroke, the tension of the spring 53 tending to move the arm 49 is prevented from functioning by the pin 67 arranged in the path of the U-shaped member 49. The valves remain in the same position and the pistons travel in the same direction until the head of the screw 8 engages the cylinder head 2. The cleaner arm is then moved upwardly to the dotted horizontal position shown in Figure 7 of the drawings. The valve 29 may then be cut off, if desired. When the cleaner is to be placed in operation again, the pin 67 is removed and the spring 53 immediately shifts the valve by moving the U-shaped arm connecting the opposite end of the cylinder to the inlet passage.

When the cleaner arm moves upwardly beyond its normal path of travel, it engages the cam 74 and rides over it. This moves the cleaner arm and cleaner element away from the window, as shown in Figure 8 of the drawings. When the pin 67 is placed in an operative position, the cleaner element is thus moved upwardly out of the driver's vision and at the same time, the cleaner element is released from contact with the surface of the window, thus prolonging the life of the cleaner element.

The features relating to the windshield cleaner per se form the subject matter of my divisional application Serial No. 48,420, filed August 5, 1925.

It is to be understood that the form of my invention herewith shown and described is to be taken as a preferred example of the same, and that various changes in the shape, size, and arrangement of parts may be resorted to without departing from the spirit of the invention or the scope of the subjoined claims.

Having thus described my invention, I claim:

1. In a windshield cleaner, a casing, a movable member mounted in said casing, a disk arranged in said casing, means controlled by the movement of said movable member for oscillating said disk, an arm pivotally connected to said disk, a valve supporting member connected to said arm, a spring arranged on said arm and engaging said member, said spring being compressed when said disk and said arm are oscillated to move said valve supporting member, and a member for being moved into the path of said valve supporting member on either side thereof for effecting a parking of the movable member in either end of the casing.

2. In a windshield cleaner, a casing, a member movable in said casing, automatic valve mechanism controlled by the movement of said member to alternately place said casing on opposite sides of said movable member in communication with a source of fluid pressure, said casing being provided with an opening, and a pin slidable in said opening for being projected into the path of travel of a part of said valve mechanism for arresting the latter, said pin being provided with a cut out portion to be engaged by said portion of the valve mechanism to prevent free outward movement of said pin.

3. In a windshield cleaner, a casing, a member movable in said casing, automatic valve mechanism controlled by the movement of said member to alternately place said casing on opposite sides of said movable member in communication with a source of fluid pressure, said valve mechanism including a pivoted arm, said casing being provided adjacent said arm with an opening, and a pin slidably mounted in said opening for being moved inwardly into the path of travel of said arm for arresting the valve mechanism, said pin being provided adjacent its inner end with a groove in which a portion of said arm is adapted to be received when said pin is moved inwardly, said arm being spring-tensioned.

4. A device constructed in accordance with claim 3 provided with means for limiting the swinging movement of said arm in either direction, said pin being movable into the path of said arm to engage either side of the latter.

5. In a windshield cleaner, a casing, a piston reciprocable therein, automatic valve mechanism for operatively admitting fluid pressure into the casing to reciprocate the piston, said automatic valve mechanism defining a normal stroke for said piston which is short of the full extent of movement to which said piston is capable, said mechanism including a valve supporting member movable back and forth from one to the other of two operative positions, a valve carried by said supporting member, and means carried by the casing for being moved into the path of said supporting member when in either of its two operative positions to prevent the functioning of said valve mechanism when the piston reaches the adjacent limit of its normal path of travel whereby said piston may continue on beyond said normal limit to its abnormal limit and be arrested thereat.

In testimony whereof, I affix my signature.

JOHN X. PHILLIPS, Jr.